(12) United States Patent
Liu

(10) Patent No.: US 8,605,458 B2
(45) Date of Patent: Dec. 10, 2013

(54) FLOATING ELECTRICAL CONNECTION DEVICE AND PROTECTIVE CASE HAVING THE SAME

(75) Inventor: Wen-Chin Liu, New Taipei (TW)

(73) Assignee: Mitac International Corp. (TW)

( * ) Notice: Subject to any disclaimer, the term of this patent is extended or adjusted under 35 U.S.C. 154(b) by 464 days.

(21) Appl. No.: 13/064,803

(22) Filed: Apr. 18, 2011

(65) Prior Publication Data

US 2012/0262888 A1 Oct. 18, 2012

(51) Int. Cl.
*H05K 7/02* (2006.01)
*H05K 7/04* (2006.01)

(52) U.S. Cl.
USPC ............................ 361/810; 361/809; 439/131

(58) Field of Classification Search
USPC ......... 361/727, 756, 758, 759, 801–803, 807, 361/809, 810; 235/435, 380, 487; 348/375, 348/231.7, 376, 207, 231; 439/131, 152, 439/153, 157, 625, 626, 629, 55, 81, 82, 439/296, 310

See application file for complete search history.

(56) References Cited

U.S. PATENT DOCUMENTS

| 6,493,033 | B1 * | 12/2002 | Glogan et al. | 348/375 |
| 6,942,153 | B1 * | 9/2005 | Yuan et al. | 235/472.01 |
| 6,970,361 | B2 * | 11/2005 | Jansen | 361/759 |
| 7,586,757 | B2 * | 9/2009 | Zhang et al. | 361/802 |
| 7,859,854 | B2 * | 12/2010 | Kinoshita et al. | 361/752 |
| 7,986,530 | B2 * | 7/2011 | Chang et al. | 361/747 |

* cited by examiner

*Primary Examiner* — Hung S Bui
(74) *Attorney, Agent, or Firm* — Davidson Berquist Jackson & Gowdey, LLP

(57) ABSTRACT

A floating electrical connection device includes a base, a support plate, a circuit board, an electric connector, and at least one spring. The base includes a bottom wall and two sidewalls. Each of the sidewalls is formed with a guide slot. The support plate is disposed between the sidewalls, and is spaced apart from the bottom wall. The support plate includes two sliding members disposed respectively on left and right sides thereof, and extending respectively and movably into the guide slots. The circuit board is disposed on the support plate. The electric connector is disposed on the circuit board, and is electrically connected to the circuit board. The spring is disposed for biasing the support plate away from the bottom wall. As such, the electric connector can be electrically connected to an additional electric connector at a selected one of at least two predetermined positions.

18 Claims, 17 Drawing Sheets

FLOATING ELECTRICAL CONNECTION DEVICE AND PROTECTIVE CASE HAVING THE SAME

BACKGROUND OF THE INVENTION

1. Field of the Invention

This invention relates to a floating electrical connection device and a protective case having the same, and more particularly to a floating electrical connection device connectable with an electric connector at a selected one of at least two predetermined positions, and a protective case having the same.

2. Description of the Related Art

Protective cases have been used widely for receiving and protecting electronic devices, such as mobile phones, personal digital assistances, and global positioning systems.

A conventional protective case, however, is typically designed to receive an electronic device having a predetermined size. In particular, when the electronic device is held within the conventional protective case, the electric connectors of the electronic device and the conventional protective case are interconnected at a predetermined position. An improved protective case has been proposed to establish an electrical connection between electric connectors of the protective case and another electronic device having a different size by a wiring structure for, e.g., charging, thereby resulting in a need for wire positioning and poor electrical contact that may occur due to movement of wires of the wiring structure.

SUMMARY OF THE INVENTION

An object of this invention is to provide a floating electrical connection device connectable with an electric connector at a selected one of at least two predetermined positions.

Another object of this invention is to provide a protective case that has a floating electrical connection device connectable with an electric connector at a selected one of at least two predetermined positions.

According to an aspect of this invention, there is provided a floating electrical connection device comprising:

a base including a bottom wall and two sidewalls disposed respectively on two opposite sides of the bottom wall, each of the sidewalls being formed with a guide slot;

a support plate disposed between the sidewalls and spaced apart from the bottom wall, the support plate including two sliding members disposed respectively on two sides thereof and extending respectively and movably into the guide slots of the sidewalls of the base, each of the sliding members being movable along a longitudinal direction of a corresponding one of the guide slots;

a circuit board disposed on the support plate;

an electric connector disposed on the circuit board and electrically connected to the circuit board; and at least one spring disposed between the bottom wall of the base and the support plate for biasing the support plate away from the bottom wall.

According to another aspect of this invention, there is provided a protective case adapted to receive a selected one of a first electronic device and a second electronic device having different sizes, the first electronic device including a first connector, the second electronic device including a second connector, the protective case comprising:

a housing unit formed with an accommodating space having a mounting opening at a front end thereof, the mounting opening being adapted to permit the selected one of the first and second electronic devices to be moved into the accommodating space therethrough;

a front cover covering openably the front end of the housing unit and formed with a through hole that is adapted to permit a portion of the selected one of the first and second electronic devices to be visible therethrough; and a floating electrical connection device including:

a base including a bottom wall and two sidewalls disposed respectively on two opposite sides of the bottom wall, each of the sidewalls being formed with a guide slot, a support plate disposed between the sidewalls and spaced apart from the bottom wall, the support plate including two sliding members disposed respectively on two sides thereof and extending respectively and movably into the guide slots of the sidewalls of the base, each of the sliding members being movable along a longitudinal direction of a corresponding one of the guide slots, a circuit board disposed on the support plate, an electric connector disposed on the circuit board and electrically connected to the circuit board, the electric connector extending into the accommodating space in the housing unit and being adapted to permit the selected one of the first and second electronic devices to be inserted into and electrically connected to the electric connector, and at least one spring disposed between the bottom wall of the base and the support plate for biasing the support plate away from the bottom wall.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
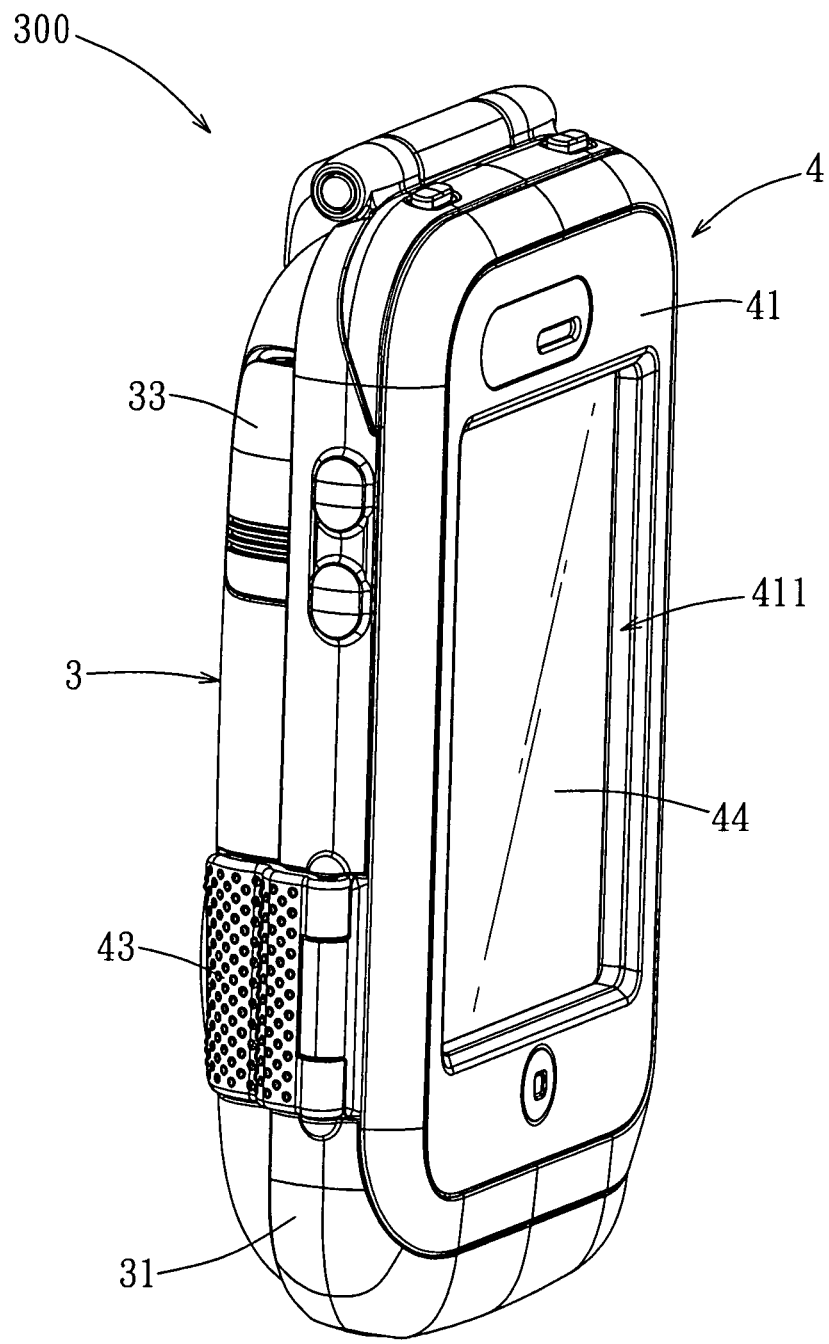
FIG. 1 is a perspective view of the preferred embodiment of a protective case according to this invention.

Referring to FIGS. 1, 2, 3, and 4, the preferred embodiment of a protective case 300 according to this invention is used in an automobile or on a desktop for receiving and protecting a selected one of a first electronic device and a second electronic device 2. The first and second electronic devices 1, 2 have different sizes. In this embodiment, the first electronic device 1 is exemplified using an iPhone, and the second electronic device 2 is exemplified using an iPod touch.

The protective case 300 includes a housing unit 3 and a front cover 4 assembled to the housing unit 3. The housing unit 3 includes an outer housing 31 and an inner housing 32. The outer housing 31 is formed with an accommodating space 311 that is open forwardly and that receives the inner housing 32. The inner housing 32 is mounted fixedly within the accommodating space 311 in the outer housing 31 by, e.g., lock bolts. The inner housing 32 is formed with an accommodating space 321 that has a mounting opening 322 at a front end thereof. The first or second electronic devices 1, 2 can be mounted into the accommodating space 321 via the mounting opening 322. The front cover 4 includes a cover body 41 that is connected pivotally to a top end of the outer housing 31 of the housing unit 3 by a pivot shaft 42 at a top end thereof. As such, the front cover 41 is rotatable relative to the housing unit 3, and covers openably a front end of the housing unit 3. In this embodiment, the front cover 4 further includes two retaining plates 43 connected respectively and pivotally to left and right sides of the cover body 41. The retaining plates 43 engage respectively two retaining grooves 312 in the outer housing 31 to allow for firm connection between the cover body 41 of the front cover 4 and the outer housing 31 of the housing unit 3.

The cover body 41 of the front cover 4 is formed with a through hole 411 extending therethrough in a front-to-rear direction. A portion of the selected one of the first and second electronic devices 1, 2 is visible through the through hole 411. In this embodiment, the through hole 411 has the same outline as a screen 11, 21 of each of the first and second electronic devices 1, 2, so that the user can touch the screen 11, 21 of the selected one of the first and second electronic devices 1, 2 through the through hole 411.

As such, it is necessary to align the screen 11, 21 of the selected one of the first and second electronic devices 1, 2 with the through hole 411 in the front cover 4 in the front-to-rear direction. However, due to different sizes of the first and second electronic devices 1, 2, it is difficult to perform alignment of the screen 11, 21 of the selected one of the first and second electronic devices 1, 2 with the through hole 411 in the front cover 4. To solve this problem, the protective case 300 further includes a floating electrical connection device 5 that is disposed on a bottom end of the inner housing 32 and that is configured to allow either the first connector 12 of the first electronic device 1 or the second connector 22 of the second electronic device 2 to be electrically connected thereto.

Figure 5:
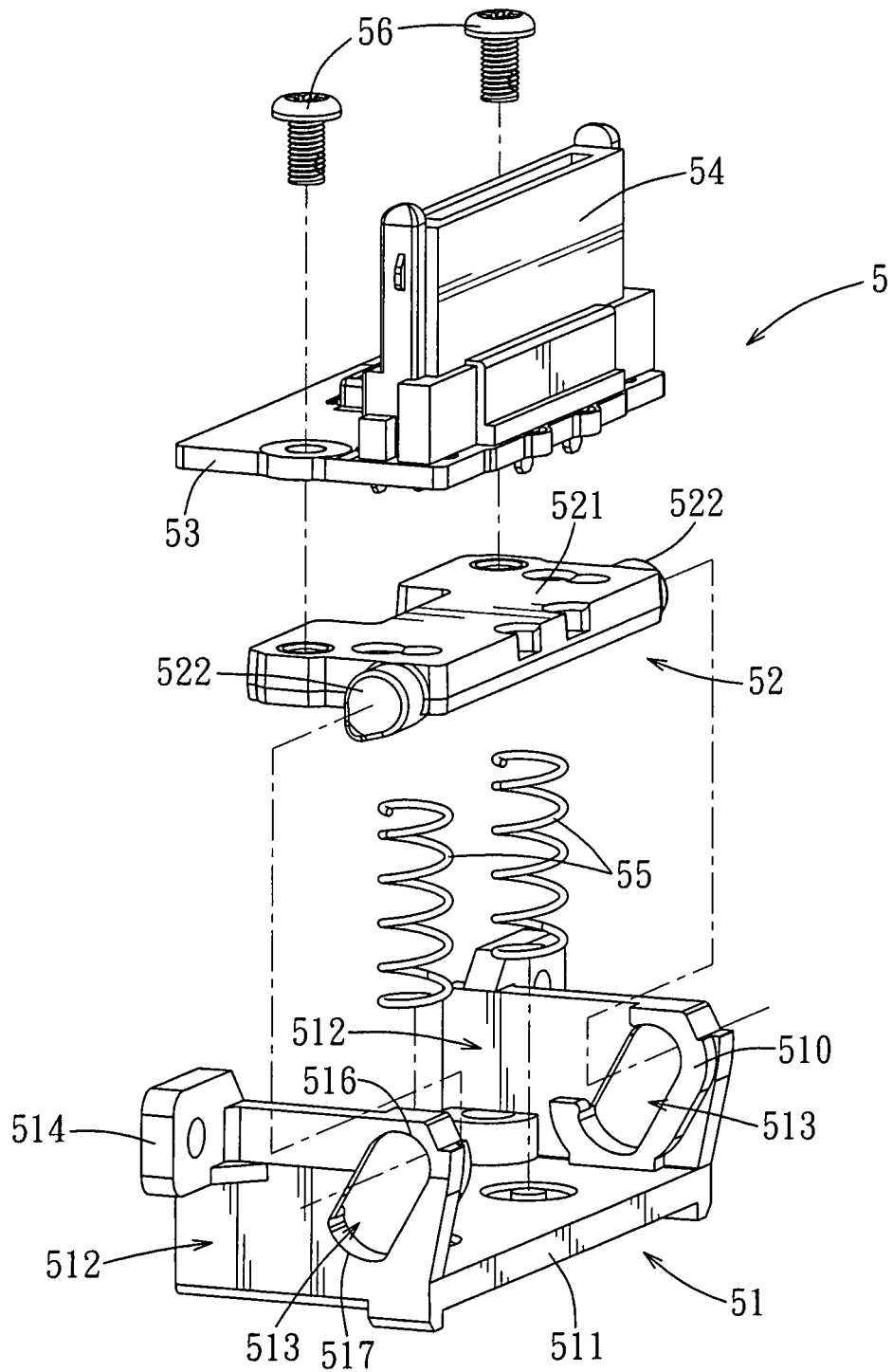
FIG. 5 is an exploded perspective view of a floating electrical connection device of the preferred embodiment.
Figure 6:
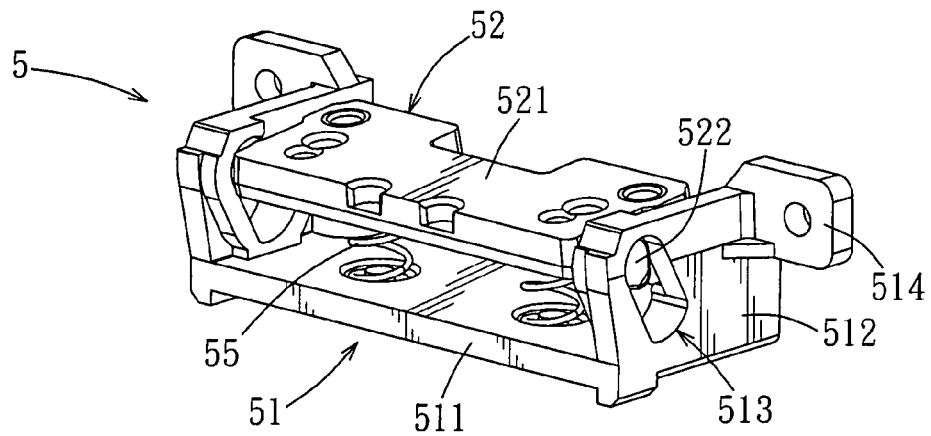
FIG. 6 is an assembled perspective view of a base, a support plate, and two springs of the floating electrical connection device of the preferred embodiment.
Figure 7:
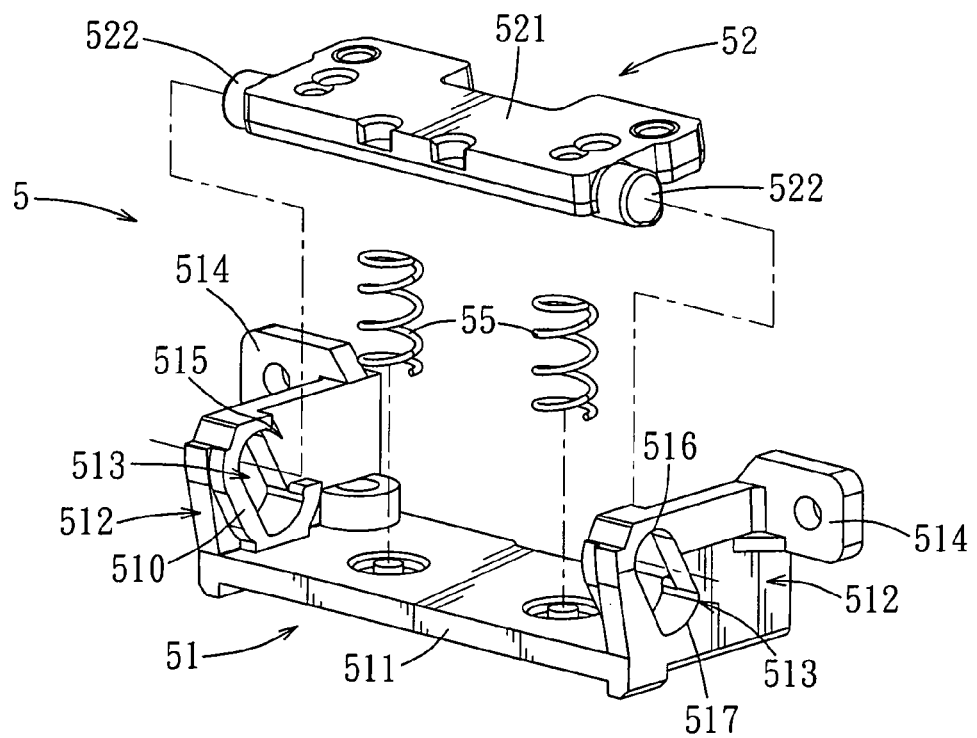
FIG. 7 is an exploded perspective view of the base, the support plate, and the springs of the floating electrical connection device of the preferred embodiment.

With additional reference to FIGS. 5, 6, and 7, the floating electrical connection device 5 includes a base 51, a support plate 52, a circuit board 53, an electric connector 54, and a spring device including at least one spring 55. The base 51 includes a bottom wall 511 and two sidewalls 512 disposed respectively on left and right sides of the bottom wall 511. Each of the sidewalls 512 extends upwardly from the bottom wall 511, and is formed with a guide slot 513. The base 51 further includes two projecting walls 514 extending respectively from the sidewalls 512. Each of the projecting walls 514 is connected fixedly to the outer housing 31 of the housing unit 3 by a bolt (not shown).

The support plate 52 is disposed between the sidewalls 512, and is spaced apart from the bottom wall 511. The support plate 52 includes a plate body 521 and two sliding members 522 extending respectively from left and right sides of the plate body 521 away from each other and configured as two rods, respectively. The plate body 521 of the support plate 52 has a top surface for supporting the circuit board 53 and the electric connector 54. The electric connector 54 is disposed on and in electric connection with the circuit board 53. The circuit board 54 is fastened to the plate body 521 of the support plate 52 by a plurality of bolts 56. The first or second connector 12, 22 can be inserted into the electric connector 22. The sliding members 522 extend respectively and movably into the guide slots 513 in the sidewalls 512. Each of the sliding members 522 is movable along a longitudinal direction of the corresponding guide slot 513. As such, an assembly of the support plate 52, the circuit board 53, and the electric connector 54 can move relative to the base 51 along the guide slots 513. In this embodiment, each of the sidewalls 512 is formed with a C-shaped flange 510 disposed around the corresponding guide slot 513 and having two spaced-apart ends defining a gap 515 therebetween. During assembly of the support plate 52 to the base 51, each of the sliding members 522 is moved into the corresponding guide slot 513 through the corresponding gap 515. During disassembly of the support plate 52 from the base 51, each of the sliding members 522 is moved away from the corresponding guide slot 513 through the corresponding gap 515.

In this embodiment, the spring device includes two springs 55 each configured as a coiled compression spring and having two ends abutting respectively against the bottom wall 511 and a bottom surface of the plate body 521 of the support plate 52, so as to bias the support plate 52 away from the bottom wall 511. As such, the assembly of the support plate 52, the circuit board 53, and the electric connector 54 is in a floating state. Hence, the first connector 12 of the first electronic device 1 can be inserted into the electric connector 54 at a position different from that of the second connector 22 of the second electronic device 2. The springs 55 are arranged in parallel and spaced apart from each other in a left-to-right direction, and are disposed respectively in proximity to left and right ends of the support plate 52, so as to ensure smooth vertical movement of the support plate 52 away from the bottom wall 511.

In this embodiment, each of the guide slots 513 has an upper end 516 and a lower end 517 opposite to and disposed below the upper end 516 for constraining the sliding members 522. Due to the biasing action of the springs 55 with respect to the support plate 52, the sliding members 522 are biased respectively toward the upper ends 516 of the guide slots 513, and undesired removal of the sliding members 522 via the gaps 515 can be prevented.

Figure 2:
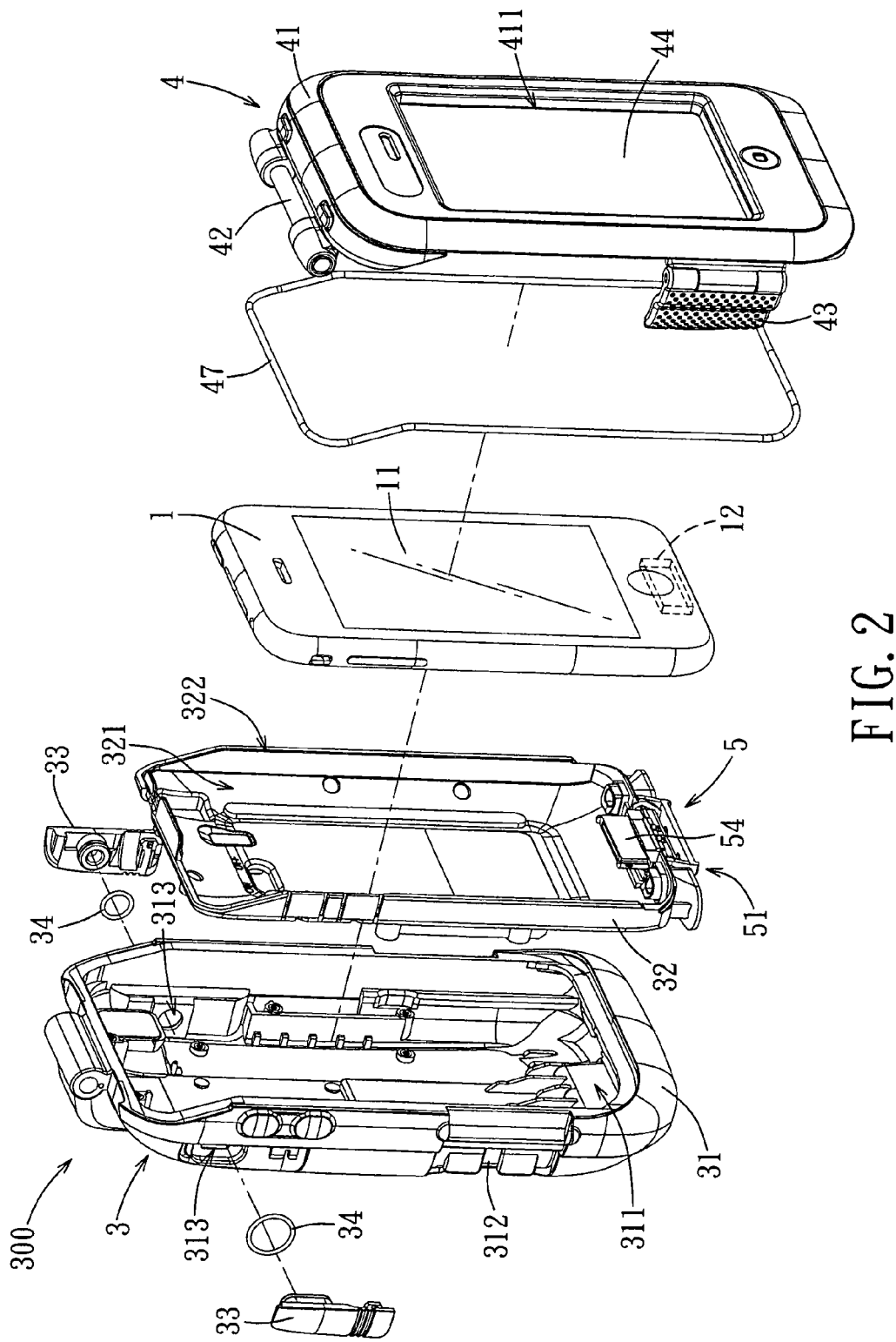
FIG. 2 is a partly exploded front perspective view of the preferred embodiment and a first electronic device.
Figure 3:
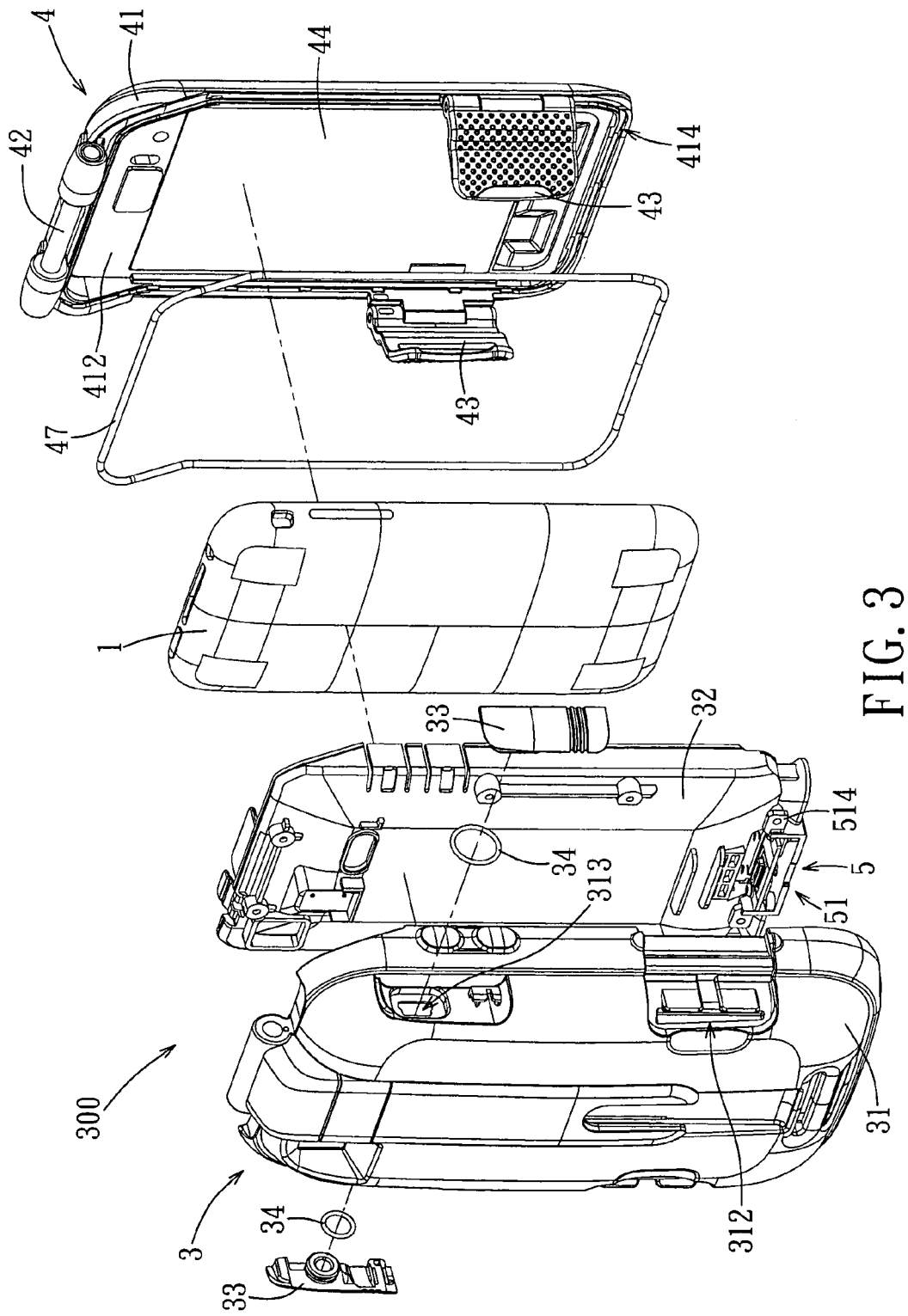
FIG. 3 is a partly exploded rear perspective view of the preferred embodiment and the first electronic device.
Figure 4:
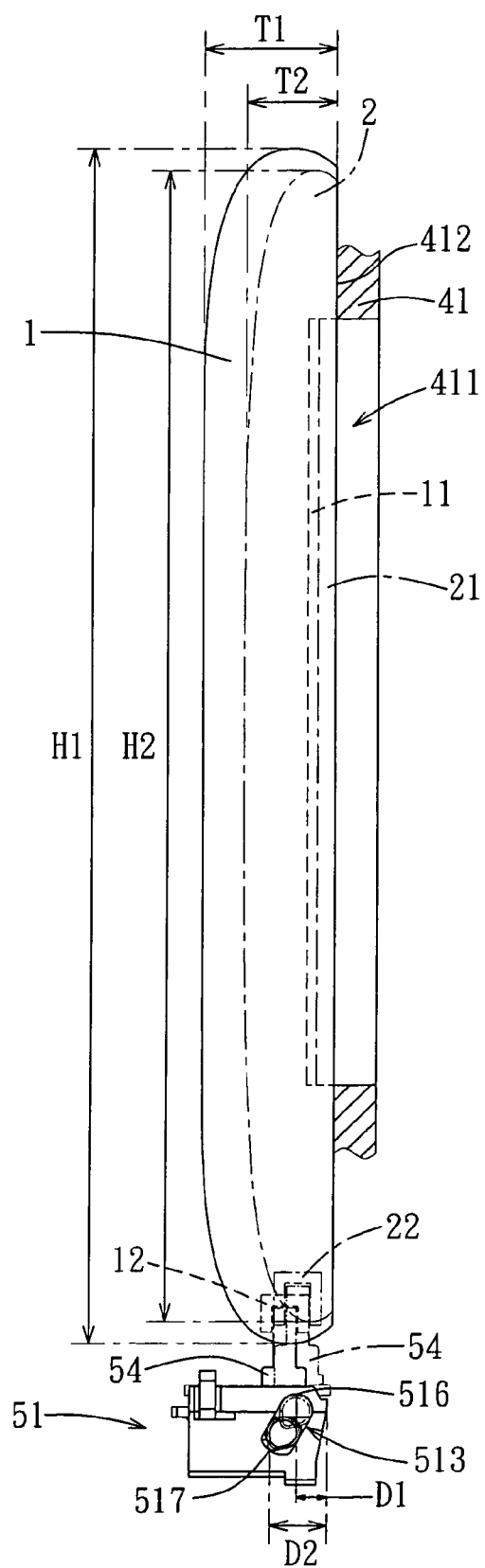
FIG. 4 is a schematic view illustrating different sizes of the first electronic device and a second electronic device.
Figure 14:
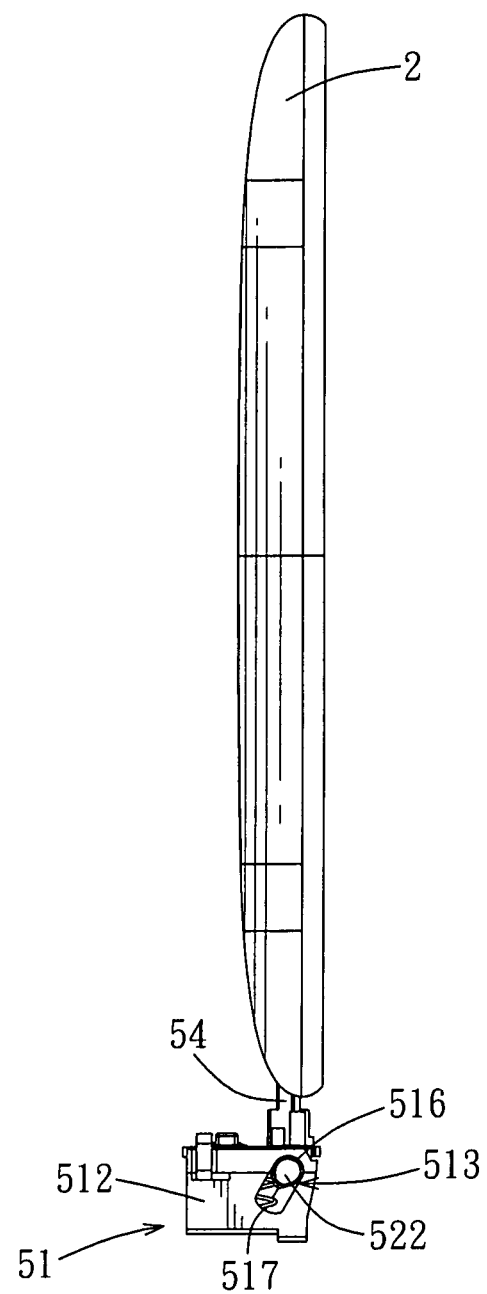
FIG. 14 is a side view of the floating electrical connection device and the second electronic device, illustrating a first height position of the electric connector.
Figure 15:
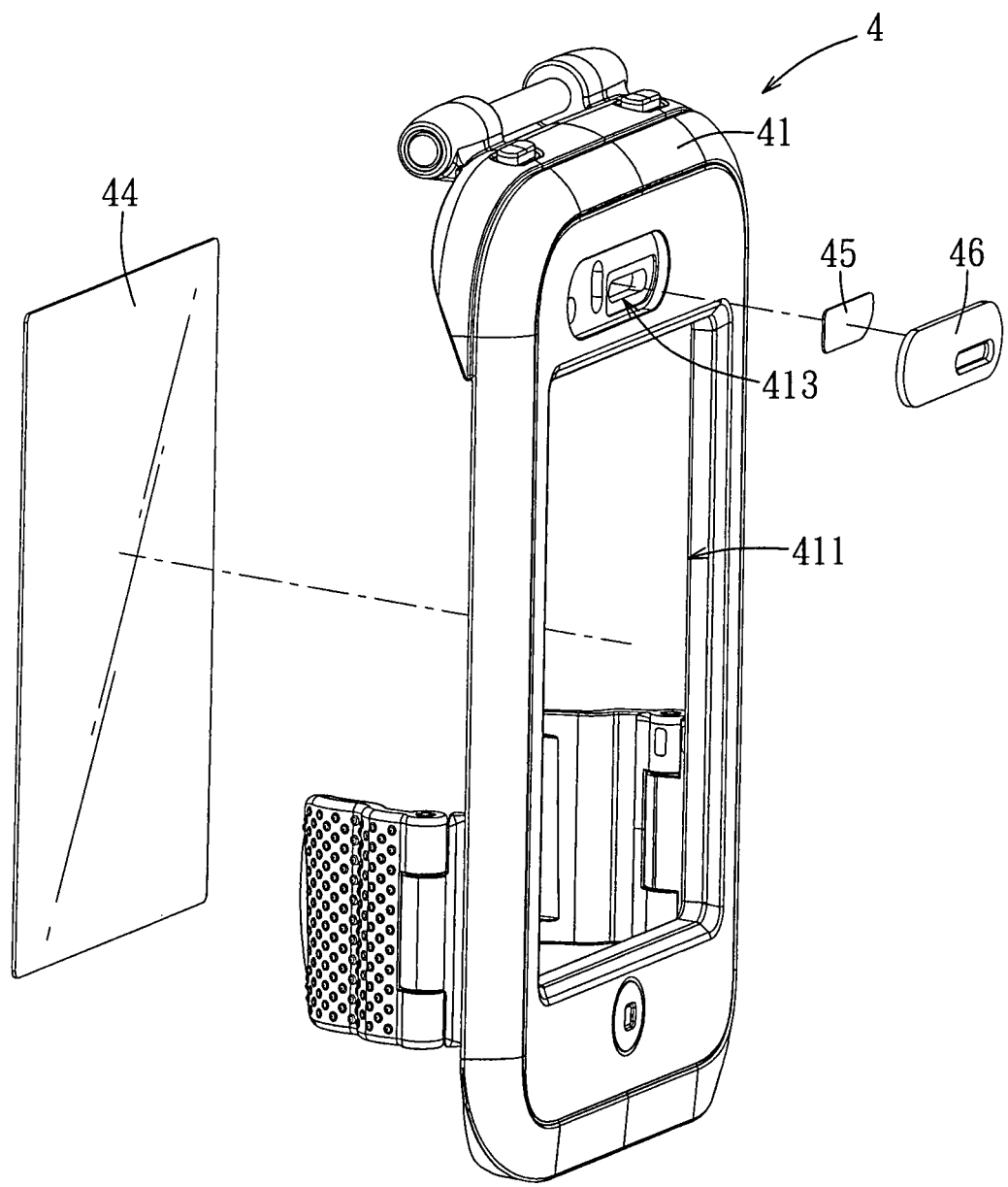
FIG. 15 is a fragmentary, partly exploded front perspective view of the preferred embodiment, illustrating first and second waterproof films.
Figure 16:
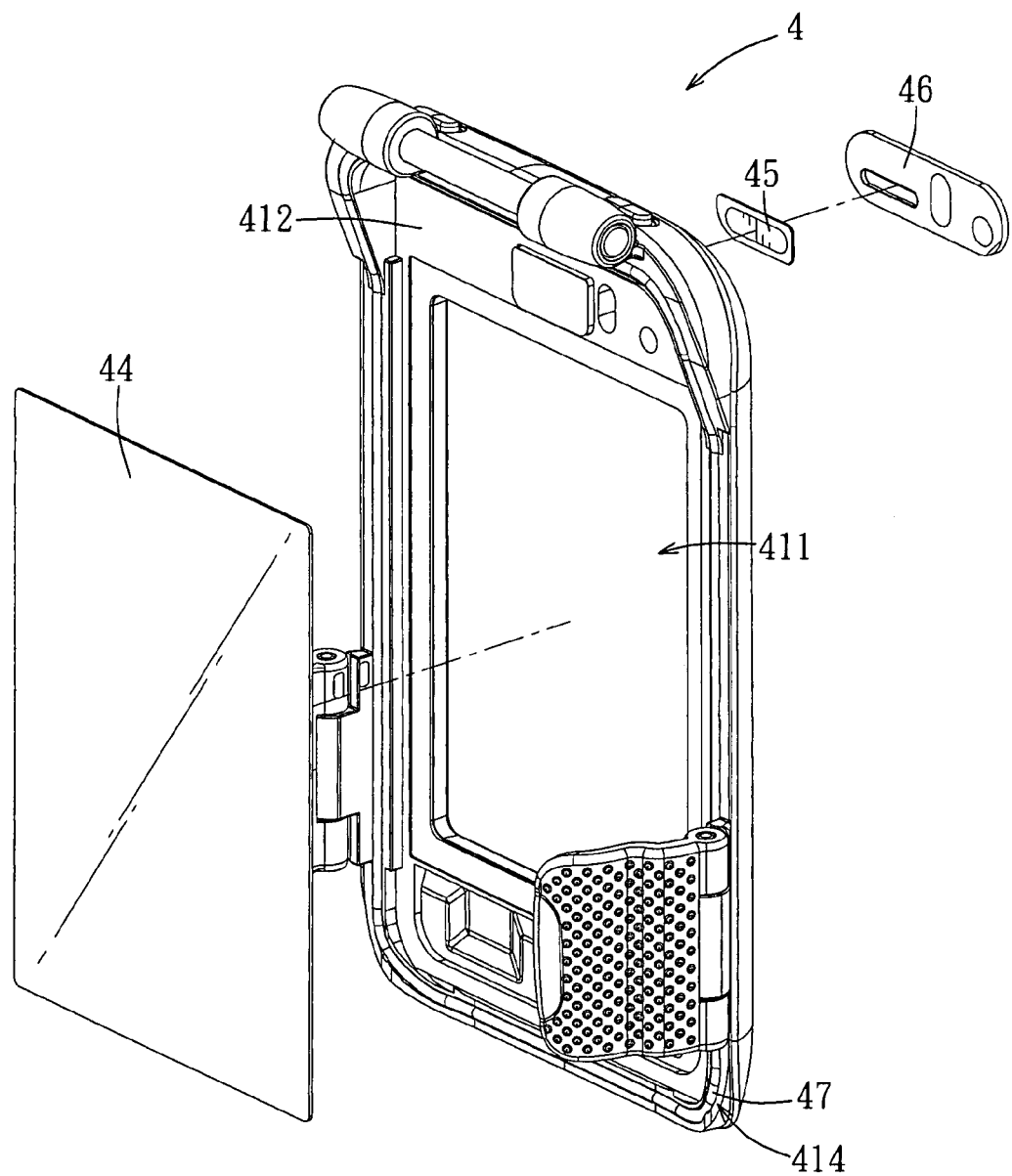
FIG. 16 is a fragmentary, partly exploded rear perspective view of the preferred embodiment, illustrating the first and second waterproof films.

With particular reference to FIGS. 2, 4, and 5, in this embodiment, the first electronic device 1 has a height (H1) that is greater than the height (H2) of the second electronic device 2, such that the second connector 22 is above the first connector 12 to allow the screens 11, 21 of the first and second electronic devices 1, 2 to align with the through hole 411 in the front cover 4. To compensate for the height difference between the first and second connectors 12, 22, the electric connector 54 is movable along the guide slots 513 between a first height position shown in FIG. 14 and a second height position shown in FIG. 10 that is below the first height position. When the electric connector 54 is at the first height position, the sliding members 522 of the support plate 52 are disposed respectively at the upper ends 516 of the guide slots 513. When the electric connector 54 is at the second height position, the sliding members 522 of the support plate 52 are disposed respectively at the lower ends 517 of the guide slots 513.

In addition, the thickness (T1) of the first electronic device 1 is greater than the thickness (T2) of the second electronic device 2, such that a front end of the second connector 22 is spaced apart from the first connector 12 in the front-to-rear direction by a horizontal distance. To compensate for the horizontal distance, the guide slots 513 are inclined forwardly and upwardly.

In this embodiment, the cover body 41 of the front cover 4 includes an abutment face 412 permitting a front end of the selected one of the first and second electronic devices 1, 2 to abut thereagainst. To enable the front end of the selected one of the first and second electronic devices 1, 2 to abut against the abutment face 412 in such a manner to align the screen 11, 21 of the selected one of the first and second electronic devices 1, 2 with the through hole 411 in the front cover 41, the upper ends 516 of the guide slots 513 are spaced apart from the abutment face 412 by a first horizontal distance (D1), and the lower ends 517 of the guide slots 513 are spaced apart from the abutment face 412 by a second horizontal distance (D2). The second horizontal distance (D2) is greater than the first horizontal distance (D1) such that, when the front end of the first electronic device 1 abuts against the abutment face 412, the first connector 12 can be inserted into the electric connector 54, and when the front end of the second electronic device 2 abuts against the abutment face 412, the second connector 22 can be inserted into the electric connector 54.

Figure 8:
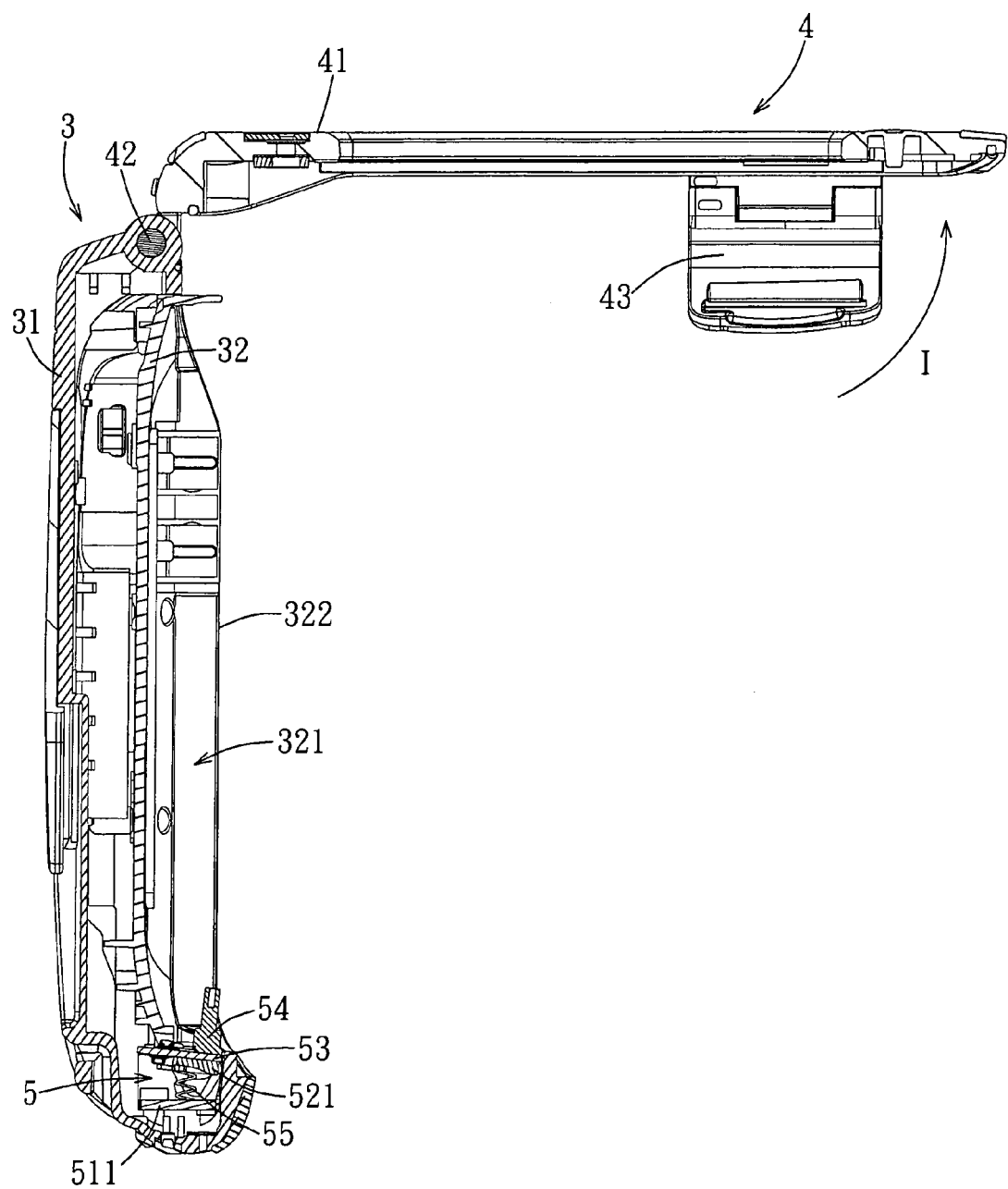
FIG. 8 is a schematic sectional view of the preferred embodiment, illustrating a first height position of an electric connector.
Figure 9:
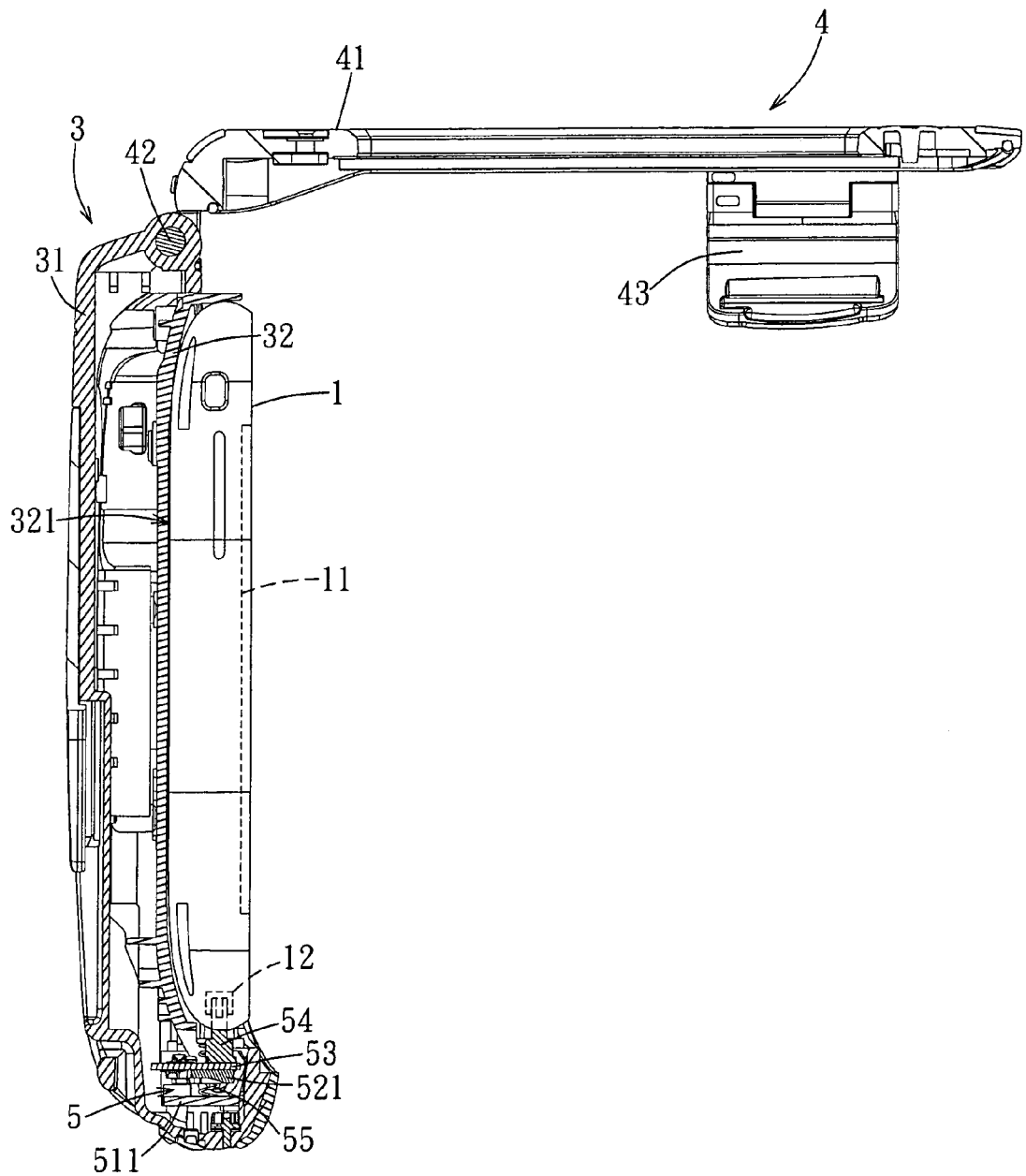
FIG. 9 is a schematic sectional view of the preferred, embodiment and the first electronic device, illustrating that the electric connector is electrically connected to a first connector of the first electronic device and that a front cover is opened.
Figure 10:
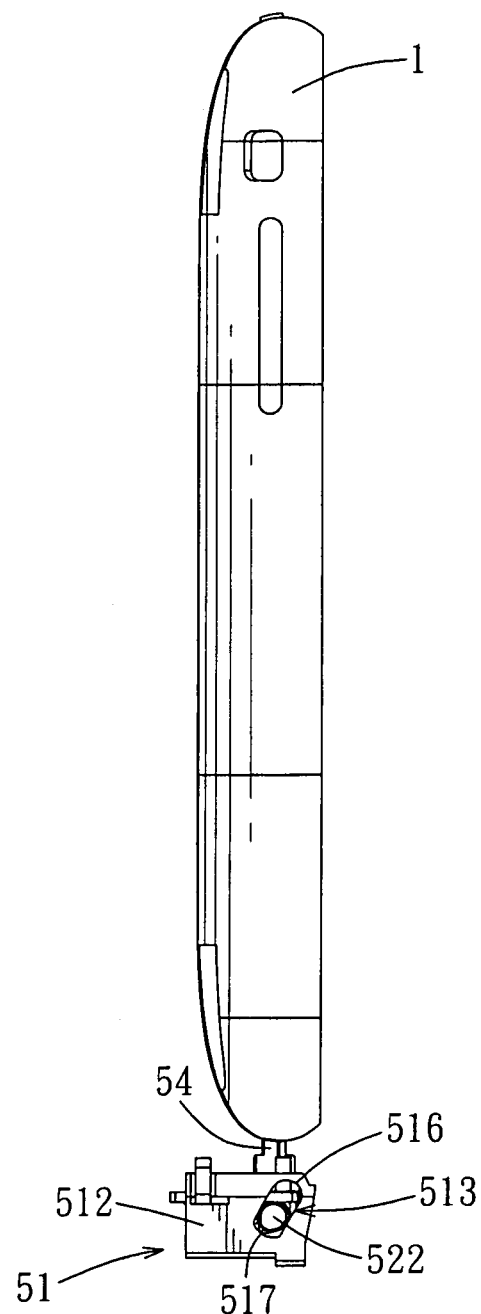
FIG. 10 is a side view of the floating electrical connection device of the preferred embodiment and the first electronic device, illustrating a second height position of the electric connector.
Figure 11:
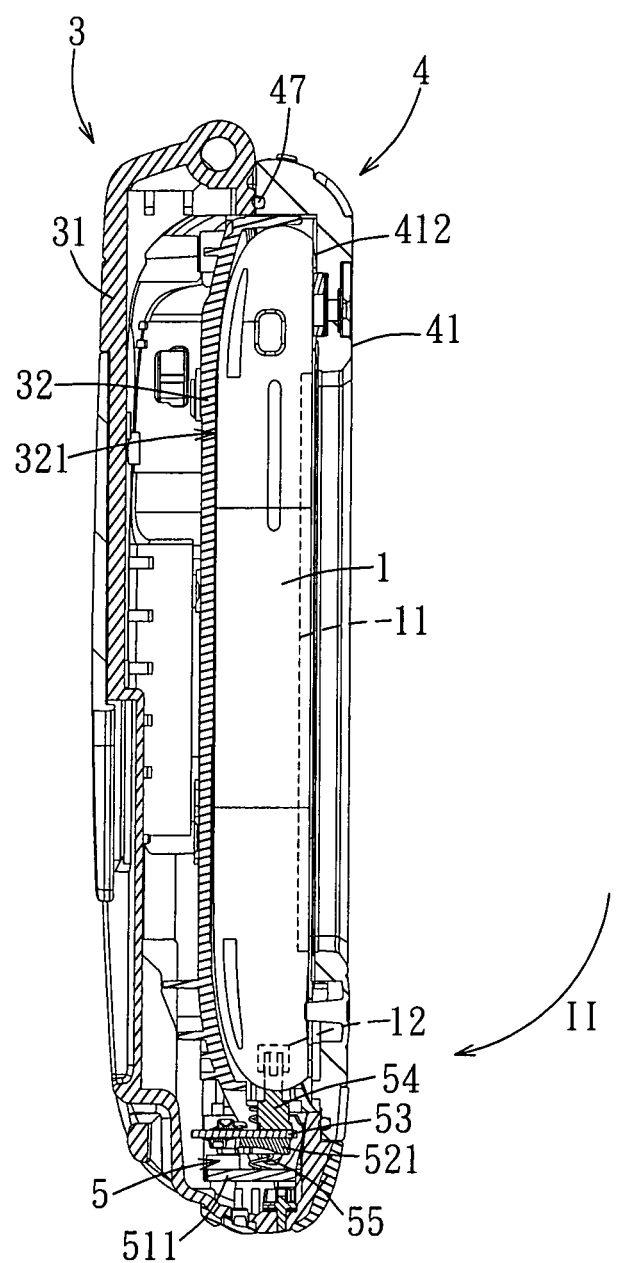
FIG. 11 a schematic sectional view of the preferred embodiment and the first electronic device, illustrating that the electric connector is electrically connected to the first connector of the first electronic device and that the front cover is closed.
Figure 12:
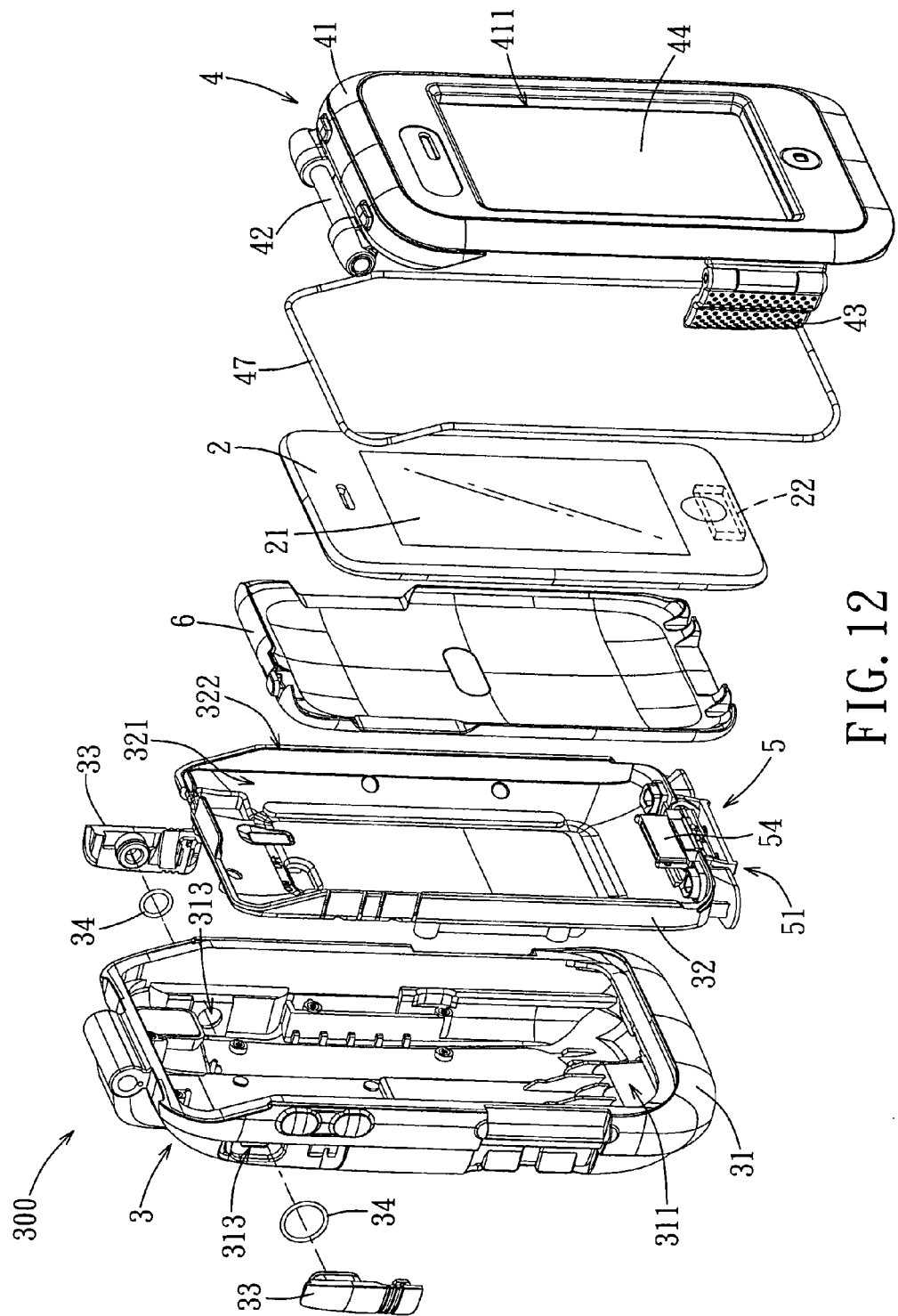
FIG. 12 is an exploded perspective view of the preferred embodiment and a second electronic device.
Figure 13:
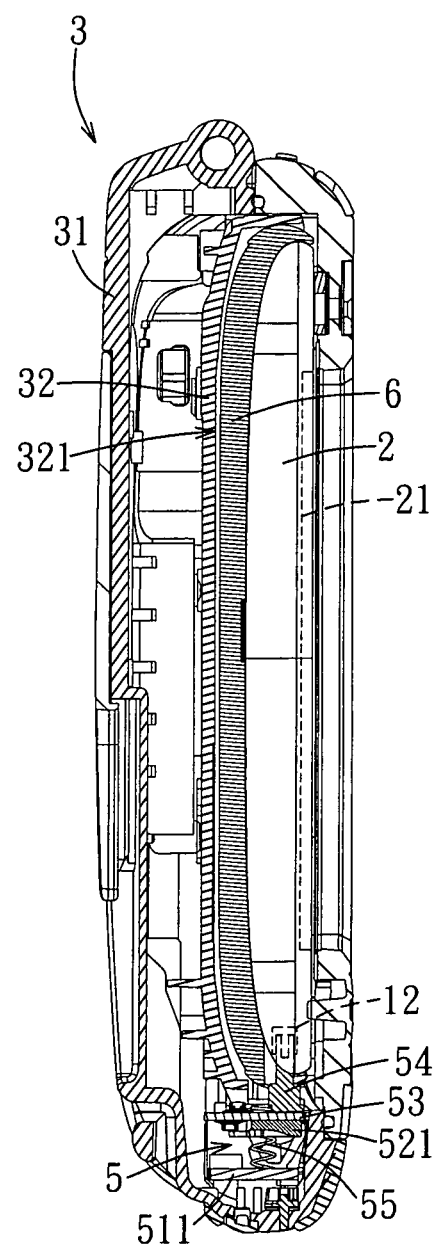
FIG. 13 is a schematic sectional view of the preferred embodiment and the second electronic device, illustrating that a second connector of the second electronic device is electrically connected to the electric connector.

When it is desired to mount the first electronic device 1 into the accommodating space 321 in the housing unit 3, the retaining plates 43 of the front cover 4 are first removed respectively from the retaining grooves 312. Next, the cover body 41 of the front cover 4 is pivoted upwardly in a direction (I) (see FIG. 8) until the accommodating space 321 in the housing unit 3 is exposed. Afterwards, the first electronic device 1 is moved into the accommodating space 321 via the mounting opening 322 to insert the first connector 12 of the first electronic device 1 into the electric connector 54, as shown in FIGS. 9 and 10. During insertion of the first connector 12 into the electric connector 54, the first electronic device 1 pushes downwardly the electric connector 54, the circuit board 53, and the support plate 52. Hence, the electric connector 54 is moved downwardly from the first height position to the second height position. As soon as the electric connector 54 reaches the second height position, the first connector 12 is inserted into the electric connector 54. In the second height position, the first electronic device 1 is fitted within the inner housing 32, so that movement of the first electronic device 1 within the housing unit 3 can be prevented. Finally, the cover body 41 of the front cover 4 is pivoted downwardly in a direction (II) (see FIG. 11) to cover the outer housing 31, and the retaining plates 43 of the front cover 4 are moved to engage respectively the retaining grooves 312 (see FIG. 11), thereby finishing mounting of the first electronic device 1. At this time, the front end of the first electronic device 1 abuts against the abutment face 412 of the front cover 4, and the screen 11 of the first electronic device 1 is aligned with the through hole 411.

Since the height (H2) and thickness (T2) of the second electronic device 2 are respectively less than the height (H1) and the thickness (T1) of the first electronic device 1, the second electronic device 2 cannot be received fittingly within the accommodating space 321 in the inner housing 32. For this reason, the protective case 300 further includes a supporting frame 6 that is used only when the second electronic device 2 is mounted into the housing unit 3 (i.e., when the selected one of the first and second electronic devices 1, 2 is the second electronic device 2). The height and thickness of the supporting frame 6 are identical respectively to the height (H1) and thickness (T1) of the first electronic device 1. The supporting frame 6 is sized to allow the second electronic device 2 to be received fittingly therein. As such, the supporting frame 6 can be fitted within the accommodating space 321 of the inner housing 32, such that the second electronic device 2 is disposed between the front cover 4 and the supporting frame 6.

When it is desired to mount the second electronic device 2 into the accommodating space 321 in the housing unit 3, the second electronic device 2 is fitted into the supporting frame 6, and an assembly of the second electronic device. and the supporting frame 6 is fitted into the accommodating space 321 in the inner housing 32 via the mounting opening 322 to insert the second connector 22 of the second electronic device 2 into the electric connector 54. Since the second electronic device 2 is supported by the supporting frame 6, during insertion of the second connector 22, the electric connector 54 remains at the first height position, so that downward movement of the electric connector 54, the circuit board 53, and the support plate 52 can be prevented. In this manner, the second electronic device 2 can be positioned stably within the accommodating space 321. When the cover body 41 of the front cover 4 is covered on the outer housing 31, the front end of the second electronic device 2 abuts against the abutment face 412, and the screen 21 of the second electronic device 2 is aligned with the through hole 411.

With particular reference to FIGS. 2, 11, 15, and 16, the protective case 300 further includes a plurality of waterproof structures to prevent access of water vapor into the first or second electronic devices 1, 2 in the protective case 300. The waterproof structures will be described in the following. The front cover 4 further includes a first transparent waterproof film 44 (see FIG. 16) adhered to the abutment face 412 by a waterproof adhesive (not shown) for sealing the through hole 411. The front end of the selected one of the first and second electronic devices 1, 2 abuts against the first waterproof film 44 for preventing access of water vapor into the protective case 300 via the through hole 411. The cover body 41 of the front cover 4 is further formed with a front speaker hole 413 (see FIG. 15). The front cover 4 further includes a second waterproof film 45 (see FIG. 15) and a decorative plate 46 (see FIG. 15). The second waterproof film 45 is adhered to the cover body 41 by a waterproof adhesive (not shown), is made of a sound-permeable material, and is disposed for sealing the front speaker hole 413 to prevent access of water vapor into the protective case 300 through the front speaker hole 413. The front cover 4 is further formed with an annular groove 414 (see FIG. 16) at a rear end thereof. A first O-ring 47 (see FIG. 16) is received within the annular groove 414, and is disposed between the cover body 41 of the front cover 4 and the outer housing 31 of the housing unit 3 and around the through hole 411 for establishing a water-tight seal between the housing unit 3 and the front cover 4.

Figure 17:
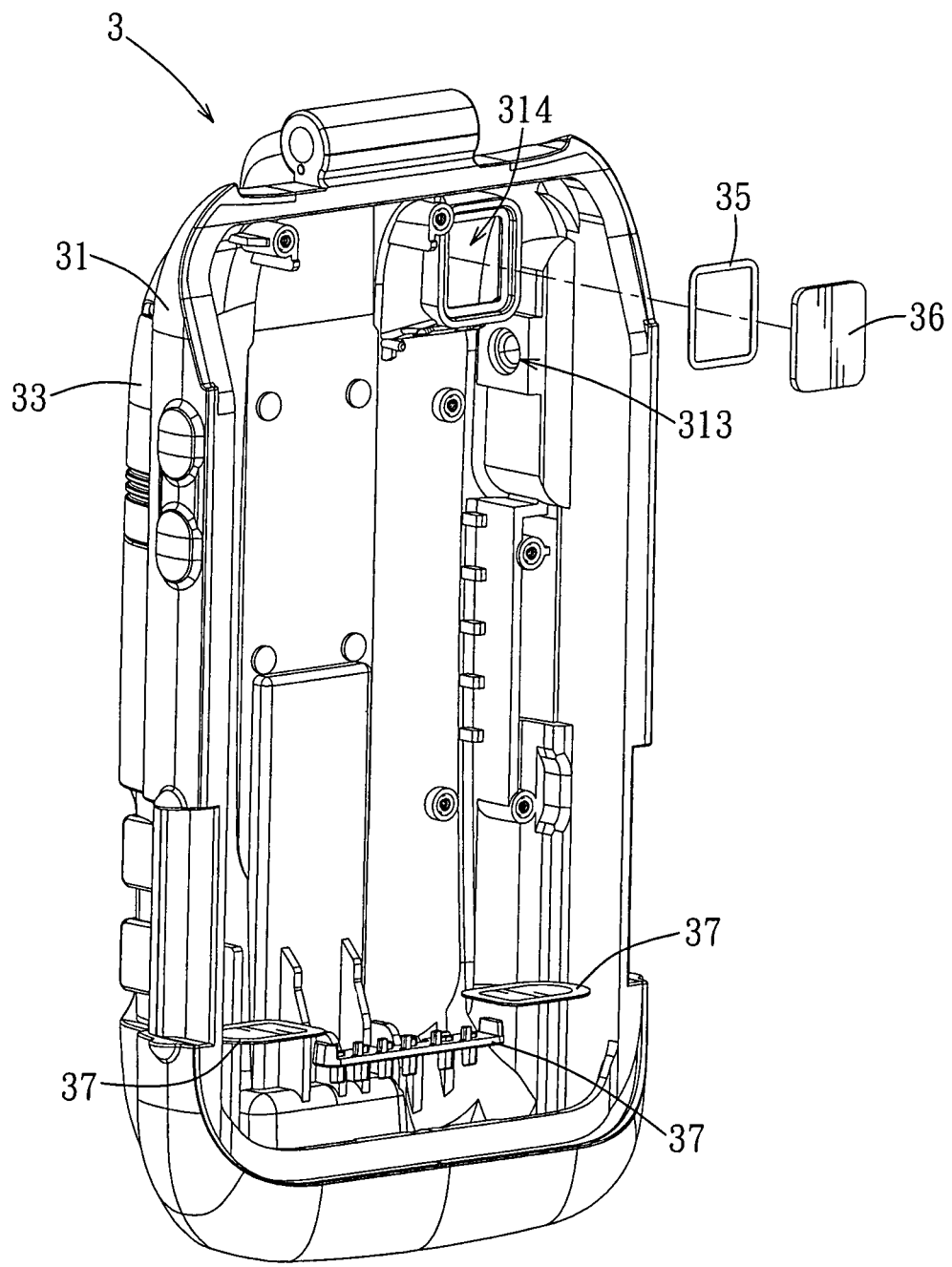
FIG. 17 is a fragmentary, partly exploded front perspective view of the preferred embodiment, illustrating third and fourth waterproof films.
Figure 18:
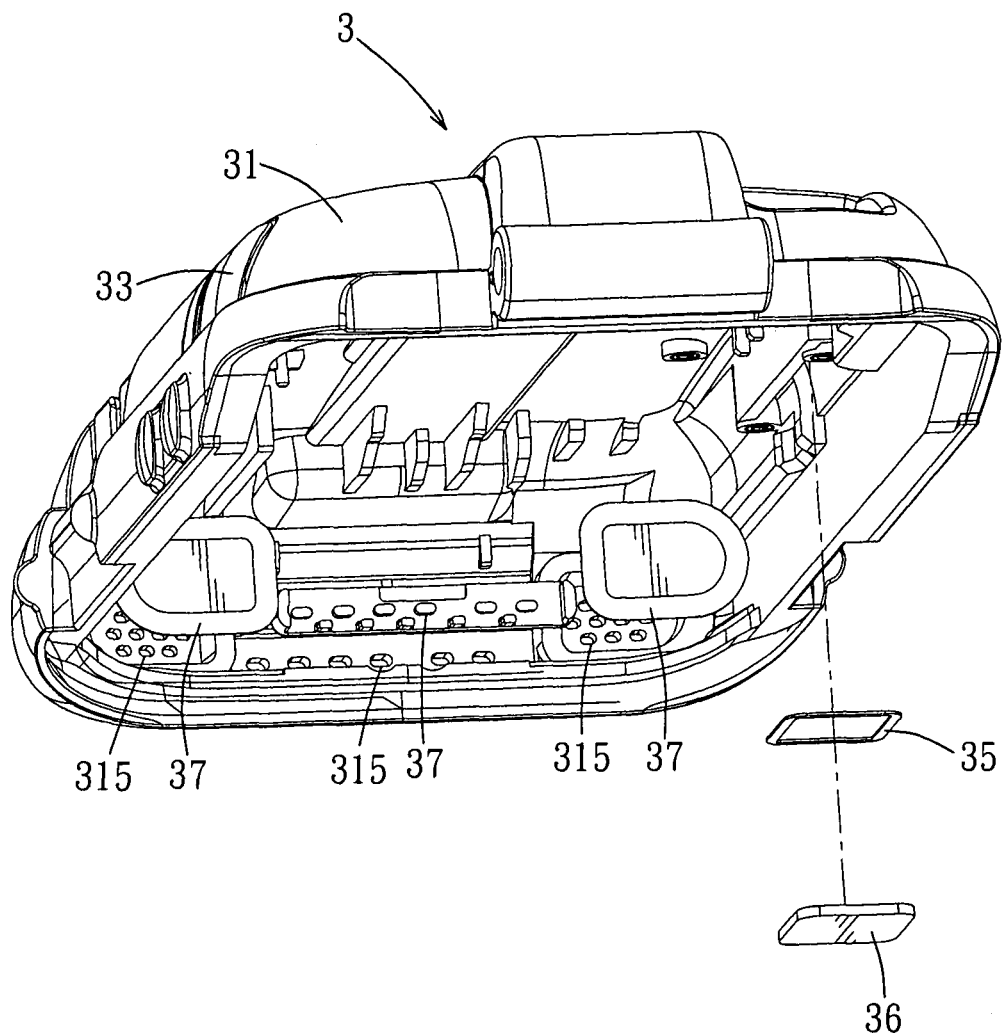
FIG. 18 is a fragmentary, partly exploded top, perspective view of the preferred embodiment, illustrating the third and fourth waterproof films.

Left and right sides of the outer housing 31 of the housing unit 3 are formed with two side insert holes 313 (see FIG. 17), respectively. The housing unit 3 further includes two side covers 33 (see FIG. 2) and two second O-rings 34 (see FIG. 2). The side covers 33 are used for sealing the side insert holes 313, respectively. Each of the second O-rings 34 is disposed between the outer housing 31 and the corresponding side cover 33 and around the corresponding side insert hole 313 for preventing access of water vapor into the protective case 300 through the corresponding side insert hole 313. The outer housing 31 of the housing unit 3 further includes a lens hole 314 (see FIG. 17). The housing unit 3 further includes a third waterproof film 35 (see FIGS. 17 and 18) and a transparent sealing cover 36. The third waterproof film 35 is adhered to the outer housing 31 for sealing the lens hole 314, thereby preventing access of water vapor into the protective case 300 through the lens hole 314. The sealing cover 36 is disposed on the outer housing 31, and is adhered to the third waterproof film 35 by a waterproof adhesive (not shown) for covering the third waterproof film 35. The outer housing 31 is further formed with a plurality of bottom speaker holes 315 (see FIG. 18) in a bottom end thereof. The housing unit 3 further includes a plurality of fourth waterproof films 37 (see FIGS. 17 and 18). The fourth waterproof films 37 are adhered to the outer housing 31, are made of a sound-permeable material, and are disposed for sealing the bottom speaker holes 315, respectively. As such, access of water vapor into the protective case 300 through the bottom speaker holes 315 can be prevented.

In view of the above, although the sizes of the first and second electronic devices 1, 2 are different, either the first electronic device 1 or an assembly of the second electronic device 2 and the supporting frame 6 can be received fittingly within the accommodating space 321 in the housing unit 3. Furthermore, the electric connector 54 is in a floating state to thereby allow for electrical connection with either of the first and second connectors 12, 22 disposed at different positions. Thus, the object of this invention is achieved. Further, due to the inclusion of the first and second O-rings 47, 34 as well as the first, second, third, and fourth waterproof films 44, 45, 35, 37, the protective case 300 has a good waterproof effect to thereby prevent access of water vapor to the selected one of the first and second electronic devices 1, 2.

With this invention thus explained, it is apparent that numerous modifications and variations can be made without departing from the scope and spirit of this invention. It is therefore intended that this invention be limited only as indicated by the appended claims.

I claim:

1. A floating electrical connection device comprising:
a base including a bottom wall and two sidewalls disposed respectively on two opposite sides of said bottom wall, each of said sidewalls being formed with a guide slot;
a support plate disposed between said sidewalls and spaced apart from said bottom wall, said support plate including two sliding members disposed respectively on two sides thereof and extending respectively and movably into said guide slots of said sidewalls of said base, each of said sliding members being movable along a longitudinal direction of a corresponding one of said guide slots;
a circuit board disposed on said support plate;
an electric connector disposed on said circuit board and electrically connected to said circuit board; and
at least one spring disposed between said bottom wall of said base and said support plate for biasing said support plate away from said bottom wall.

2. The floating electrical connection device as claimed in claim 1, wherein said guide slot of each of said sidewalls of said base has an upper end and a lower end for constraining said sliding members, and wherein the lower end is opposite to and disposed below said upper end.

3. The floating electrical connection device as claimed in claim 2, wherein each of said guide slots is inclined.

4. The floating electrical connection device as claimed in claim 3, wherein each of said sidewalls is further formed with a C-shaped flange disposed around each of said guide slots and having two spaced-apart ends defining a gap therebetween, which permits a corresponding one of said sliding members to be moved into or away from a corresponding one of said guide slots therethrough.

5. The floating electrical connection device as claimed in claim 4, wherein said floating electrical connection device comprises two said springs arranged in parallel and spaced apart from each other.

6. A protective case adapted to receive a selected one of a first electronic device and a second electronic device having different sizes, the first electronic device including a first connector, the second electronic device including a second connector, said protective case comprising:
a housing unit formed with an accommodating space having a mounting opening at a front end thereof, said mounting opening being adapted to permit the selected one of the first and second electronic devices to be moved into said accommodating space therethrough;
a front cover covering openably said front end of said housing unit and formed with a through hole that is adapted to permit a portion of the selected one of the first and second electronic devices to be visible therethrough; and
a floating electrical connection device including:
a base including a bottom wall and two sidewalls disposed respectively on two opposite sides of said bottom wall, each of said sidewalls being formed with a guide slot,
a support plate disposed between said sidewalls and spaced apart from said bottom wall, said support plate including two sliding members disposed respectively on two sides thereof and extending respectively and movably into said guide slots of said sidewalls of said base, each of said sliding members being movable along a longitudinal direction of a corresponding one of said guide slots,
a circuit board disposed on said support plate,
an electric connector disposed on said circuit board and electrically connected to said circuit board, said electric connector extending into said accommodating space in said housing unit and being adapted to permit the selected one of the first and second electronic devices to be inserted into and electrically connected to said electric connector, and at least one spring disposed between said bottom wall of said base and said support plate for biasing said support plate away from said bottom wall.

7. The protective case as claimed in claim 6, heights of the first and second electronic devices being different, wherein said guide slot of each of said sidewalls of said base has an upper end and a lower end for constraining said sliding members, and wherein said lower end is opposite to and disposed below said upper end.

8. The protective case as claimed in claim 7, thickness of the first and second electronic devices being different, wherein each of said guide slots is inclined.

9. The protective case as claimed in claim 8, wherein said front cover includes an abutment face adapted to permit a front end of the selected one of the first and second electronic devices to abut thereagainst, said upper end of said guide slot being spaced apart from said abutment face by a first distance, said lower end of guide slot being spaced apart from said abutment face by a second distance, said second distance being greater than said first distance.

10. The protective case as claimed in claim 9, wherein each of said sidewalls is further formed with a C-shaped flange disposed around each of said guide slots and having two spaced-apart ends defining a gap therebetween, which permits a corresponding one of said sliding members to be moved into or away from a corresponding one of said guide slots therethrough.

11. The protective case as claimed in claim 10, wherein said floating electrical connection device comprises two said springs arranged in parallel and spaced apart from each other.

12. The protective case as claimed in claim 9, further comprising a supporting frame fitted within said accommodating space and adapted for receiving the second electronic device fittingly when the selected one of the first and second electronic devices is the second electronic device, in such a manner that the second electronic device is disposed between said front cover and said supporting frame.

13. The protective case as claimed in claim 12, wherein said front cover further comprises a first waterproof film adhered to said abutment face for sealing said through hole, said first waterproof film being adapted to abut against the front end of the selected one of the first and second electronic devices.

14. The protective case as claimed in claim 13, wherein said front cover further includes a cover body formed with said through hole, a second waterproof film, and a decorative plate, said cover body being further formed with a front speaker hole, said second waterproof film being adhered to said cover body for sealing said front speaker hole, said decorative plate being disposed on said cover body and being adhered to said second waterproof film.

15. The protective case as claimed in claim 14, further comprising a first O-ring, wherein when said front cover covers said front end of said housing unit, the first O-ring is disposed between said housing unit and said front cover and around said through hole in said front cover for establishing a water-right seal between said housing unit and said front cover.

16. The protective case as claimed in claim 15, wherein said housing, unit includes an outer housing, a side cover, and a second O-ring, said outer housing having a side insert hole formed therethrough, said side cover covering said side insert hole, said second O-ring being disposed between said outer housing and said side cover and around said, side insert hole for establishing a water-right seal between said outer housing and said side cover.

17. The protective case as claimed in claim 16, wherein said outer housing further has a lens hole, said housing unit further including a third waterproof film adhered to said outer housing for sealing said lens hole, and a sealing cover adhered to said third waterproof film for covering said third waterproof film.

18. The protective case as claimed in claim 16, wherein said outer housing further has a bottom speaker hole formed therethrough, said housing unit further including a fourth waterproof film adhered to said outer housing for sealing said bottom speaker hole.

* * * * *